(12) United States Patent
Cheng

(10) Patent No.: US 8,322,002 B2
(45) Date of Patent: Dec. 4, 2012

(54) FASTENING STRAP ASSEMBLY AND FOAM ARTICLE INCLUDING SAME

(75) Inventor: Allen Cheng, Chang Hwa Hsien (TW)

(73) Assignee: Taiwan Paiho Limited (TW)

( * ) Notice: Subject to any disclaimer, the term of this patent is extended or adjusted under 35 U.S.C. 154(b) by 383 days.

(21) Appl. No.: 12/659,593

(22) Filed: Mar. 15, 2010

(65) Prior Publication Data

US 2011/0167598 A1 Jul. 14, 2011

(30) Foreign Application Priority Data

Jan. 12, 2010 (TW) ................................ 99100689 A

(51) Int. Cl.
*A44B 18/00* (2006.01)
(52) U.S. Cl. ............... 24/452; 24/444; 24/298; 428/100
(58) Field of Classification Search ........................ None
See application file for complete search history.

(56) References Cited

U.S. PATENT DOCUMENTS

| | | | | | |
|---|---|---|---|---|---|
| 3,717,908 | A | * | 2/1973 | Perina ............................ | 24/444 |
| 4,563,380 | A | * | 1/1986 | Black et al. .................... | 428/100 |
| 4,693,921 | A | * | 9/1987 | Billarant et al. ............... | 428/100 |
| 4,710,414 | A | * | 12/1987 | Northrup et al. ................ | 428/43 |
| 4,726,975 | A | * | 2/1988 | Hatch ........................... | 428/100 |
| 4,784,890 | A | * | 11/1988 | Black ............................ | 428/100 |
| 4,802,939 | A | * | 2/1989 | Billarant et al. ............... | 156/155 |
| 4,933,035 | A | * | 6/1990 | Billarant et al. ............... | 156/155 |
| 5,422,156 | A | * | 6/1995 | Billarant ....................... | 428/100 |
| 5,725,928 | A | * | 3/1998 | Kenney et al. ................. | 428/100 |
| 5,736,217 | A | * | 4/1998 | Banfield et al. ................ | 428/100 |
| 5,945,193 | A | * | 8/1999 | Pollard et al. .................. | 428/100 |
| 6,463,635 | B2 | * | 10/2002 | Murasaki ........................ | 24/452 |
| 6,656,563 | B1 | * | 12/2003 | Leach et al. ................... | 428/100 |
| 6,803,010 | B2 | * | 10/2004 | Leach et al. ............... | 264/297.3 |
| 6,896,759 | B2 | * | 5/2005 | Fujisawa et al. .......... | 156/244.18 |
| 7,022,394 | B2 | * | 4/2006 | Fujisawa et al. ................ | 428/99 |
| 7,390,057 | B2 | * | 6/2008 | Autterson ...................... | 296/214 |
| 7,488,527 | B2 | * | 2/2009 | Herrero et al. ................ | 428/100 |
| 7,927,681 | B2 | * | 4/2011 | Cheng ........................... | 428/100 |
| 7,998,548 | B2 | * | 8/2011 | Murasaki et al. ............. | 428/100 |
| 2002/0023322 | A1 | * | 2/2002 | Murasaki ........................ | 24/452 |
| 2003/0009144 | A1 | * | 1/2003 | Tanzer et al. .................. | 604/391 |
| 2004/0103503 | A1 | * | 6/2004 | Leach et al. .................... | 24/452 |

* cited by examiner

*Primary Examiner* — Jack W. Lavinder
(74) *Attorney, Agent, or Firm* — Bacon & Thomas, PLLC

(57) ABSTRACT

One aspect of the present invention provides a fastening strap assembly for used in a foam article. The fastening strap assembly includes a substrate having two sidewalls each formed along one side thereof in a longitudinal direction and spaced apart from each other; a substantially fishbone-shaped fastening member disposed between the sidewalls and adhered to the substrate, the fastening member having an elongate central rib and a plurality of fastening parts laterally extending from either sides of the rib and longitudinally spaced apart from each other, each fastening part having a plurality of hooks formed on a upper surface thereof; and a magnetic layer disposed between the substrate and the fastening member. The fastening strap assembly of the present invention has a unique sideway bending/curving function. Another aspect of the present invention provides a foam article, such as a seat cushion, including the sideway-bendable fastening strap assembly.

7 Claims, 7 Drawing Sheets

FASTENING STRAP ASSEMBLY AND FOAM ARTICLE INCLUDING SAME

FIELD OF THE INVENTION

The present invention relates generally to a sideway-bendable fastening strap assembly for used in a foam article, and a foam article, such as a seat cushion, including the fastening strap assembly.

BACKGROUND OF THE INVENTION

A hook-and-loop fastener is a well-know type of fastener and because of its easy engaging/disengaging characteristic it is wildly adapted in a wide variety of fields that need to detachably fasten two articles together. Generally, as shown in FIG. 1, a hook-and-loop type fastening strap 1 used in a seat cushion of a car or a seat cushion of a sofa for detachably fastening a seat coverings (not shown) to a seat includes a substrate 2 made of a material that allow foam material to penetrate into the voids of the substrate material, such as non-woven fabric or fibrous fabric. This hook-and-loop type fastening strap 1 further includes a magnetic material layer 3 coated on the substrate 1 and a fastening member 4 bonded to the magnetic material layer 3. The fastening member 4 has a plurality of hooks 5 formed thereon and has a width narrower than that of the substrate 2. The substrate 2 has two longitudinal sidewalls 6 each formed along the sides of the fastening member 4 and having a height greater than a height of the hooks 5, so as to prevent the foam material from entering the spaces between the hooks 5 during a foaming process of a seat cushion manufacturing.

Another form of hook-and-loop type fastening strap 1' used in a seat cushion is shown in FIG. 2 and includes a substrate 2, a magnetic material layer 3, and a fastening member 4. Instead of having two protective sidewalls, this fastening strap 1' includes a protective layer 7 that directly and detachably engages with the hooks 5 of the fastening member 4 to provide a protective function that prevents the foam material from entering the spaces between the hooks 5 during the foaming process of a seat cushion manufacturing.

Although the above-mentioned hook-and-loop type fastening straps used in a seat cushion of a car or a seat cushion of a sofa may provide a function of detachably fixing the seat coverings onto a seat cushion, they have drawbacks and application limitations. For instance, the fixing between the above-mentioned prior art fastening straps and the seat cushion is provided merely by the joining force created by the penetration of the foam material into the voids of the substrate material, and thus an unexpected separation between the fastening straps and the seat cushion may occur due to insufficient joint force therebetween.

Additionally, because the above-mentioned prior art fastening straps are unable to bend or curve sideway, they can only be used in seat cushions that have substantially straight fixing grooves. For seat cushions having curved fixing grooves, extra processes need to be taken to allow the above-mentioned prior art fastening straps to be applied. For instance, additional cutting molds having specific curvatures that match with the curvatures of the curved fixing grooves of a specific seat cushion to which the fastening straps are to be applied need to be developed to cut the fastening straps into shapes having desired curvatures. However, this is not cost effective because a specific cutting mold needs to be developed for a curved fixing groove of a seat cushion, and if there are a number of curved fixing grooves of different curvatures in one seat cushion then a number of different cutting molds are needed to cut the fastening straps into desired shapes. Thus, the applicability of the prior art fastening straps is limited.

Therefore, there exists a need in seat cushion industry for a fastening strap assembly that is able to provide a strong bonding between the fastening strap and the seat cushion, and is capable of bending or curving sideway so as to be applicable to seat cushions having straight and curved fixing grooves without any extra processes.

SUMMARY OF THE INVENTION

In view of the above-mentioned disadvantages/problems associated with the existing fastening straps used in a seat cushion, one object of the present invention is to provide a fastening strap assembly used in a foam article that is able to provide a strong bonding between the fastening strap assembly and the seat cushion, and is capable of bending or curving sideway. Another object of the present invention is to provide a foam article that includes the fastening strap assembly.

According to one embodiment of the present invention, a fastening strap assembly is provided which includes:

a laterally stretchable/compressible substrate having two sidewalls each formed along one side thereof in a longitudinal direction and spaced apart from each other;

a substantially fishbone-shaped fastening member disposed between the sidewalls and bonded to the substrate, the fastening member having an elongate central rib and a plurality of fastening parts laterally extending from either sides of the rib and longitudinally spaced apart from each other, each fastening part having a plurality of hooks formed on an upper surface thereof; and a magnetic layer disposed between the substrate and the fastening member.

According to another embodiment of the present invention, a fastening strap assembly is provided which includes:

a substantially fishbone-shaped fastening member having an elongate central rib and a plurality of fastening parts laterally extending from either sides of the rib and longitudinally spaced apart from each other, each fastening part having a plurality of hooks formed on an upper surface thereof;

a laterally stretchable/compressible substrate having a substantially the same fishbone shape as that of the fastening member and being disposed under the fastening member and bonded thereto; and a protective layer having a substantially the same fishbone shape as that of the fastening member and disposed above the fastening member to cover the fastening member, and having a magnetic material layer coated on an outer surface thereof, wherein the substrate, the fastening member and the protective layer are bonded together along a periphery of the fastening parts of the fastening member and perforations are provided in the protective layer and magnetic material layer along the bonded periphery thereof.

According to another aspect of the present invention, a foam article is provided which includes:

a foam body; and at least one fastening strap assemblies of the above-described embodiments of the present invention bonded to the foam body.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings, wherein.

DETAILED DESCRIPTION OF THE INVENTION

Referring now to FIGS. 3-10 in which preferred embodiments of the fastening strap assembly of the present invention and a seat cushion containing the fastening strap assembly are illustrated to describe the present invention.

Figure 1:
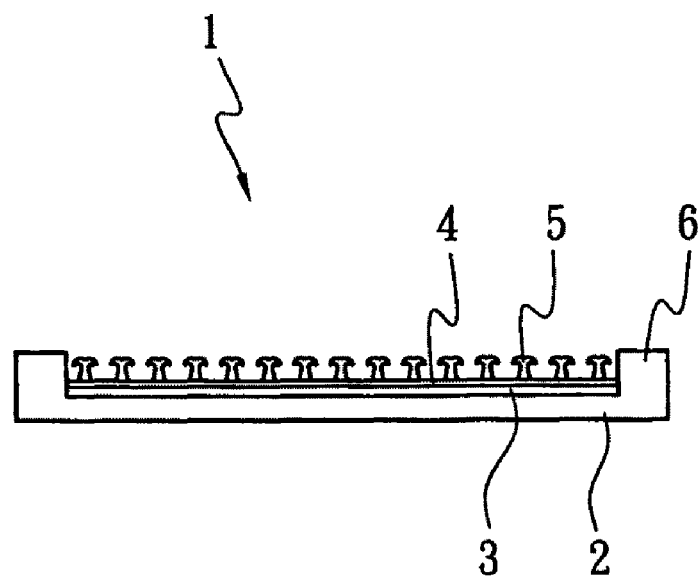
FIG. 1 is a schematic cross-sectional view illustrating a prior art fastening strap structure used in a seat cushion.
Figure 2:
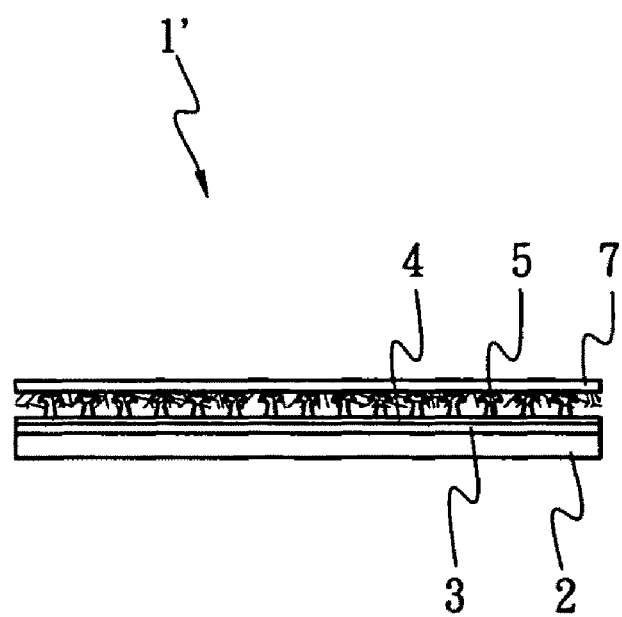
FIG. 2 a schematic cross-sectional view illustrating another prior art fastening strap structure used in a seat cushion.
Figure 3:
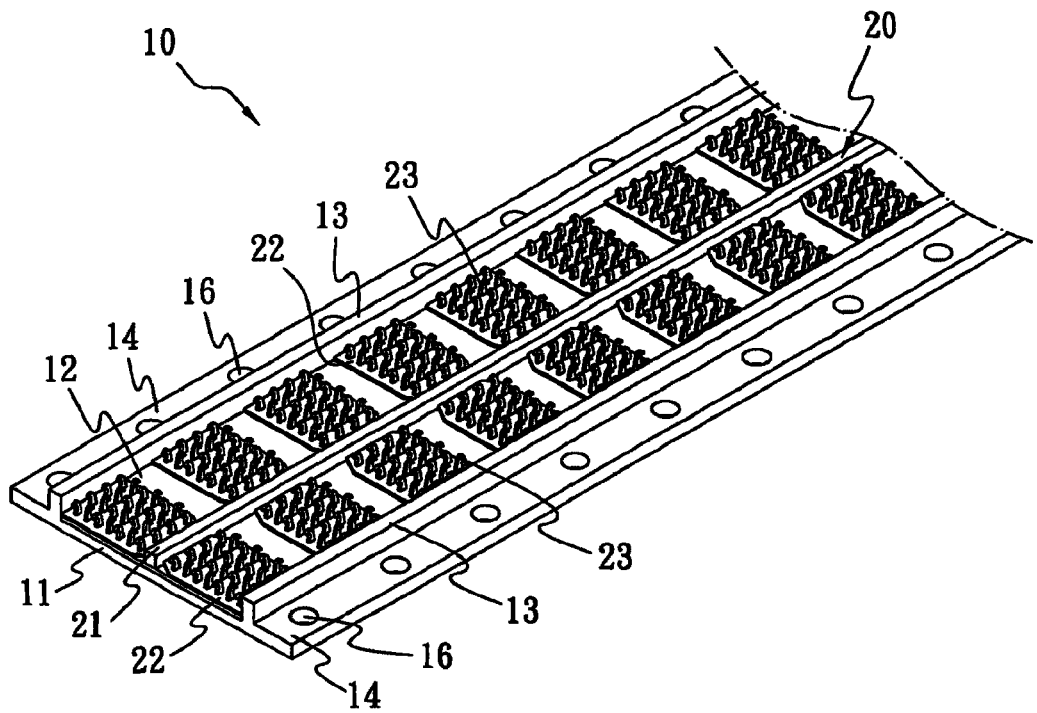
FIG. 3 is a schematic perspective view showing a fastening strap assembly according to an embodiment of the present invention.
Figure 4:
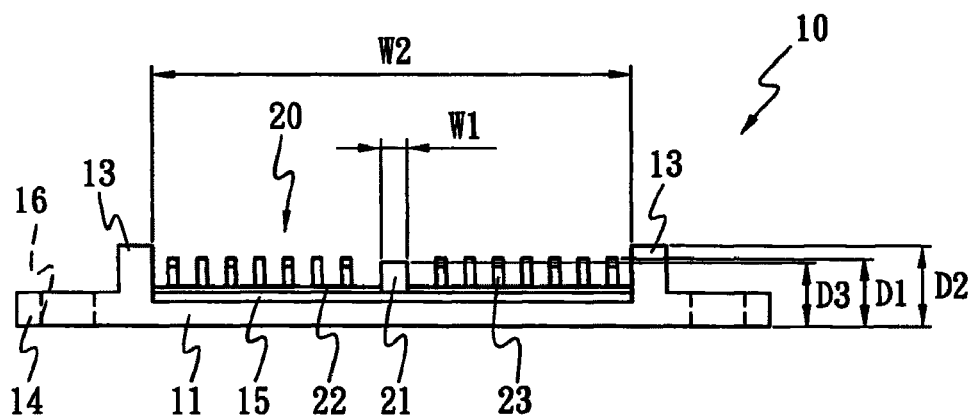
FIG. 4 is a schematic end view of the fastening strap assembly shown in FIG. 3.

FIG. 3 is a schematic perspective view illustrating a fastening strap assembly 10 according to a preferred embodiment of the present invention. FIG. 4 is a schematic end view of the fastening strap assembly 10 shown in FIG. 3. As shown in these two figures, the fastening strap assembly 10 of the present invention includes a substrate 11 which has two sidewalls 13 each formed along one side thereof in a longitudinal direction and spaced apart from each other, and two side wings 14 each extending out laterally at a lower portion of a sidewall 13 respectively. In this embodiment, the substrate 11 is made of, for example, a foam material, a non-woven fabric or a fibrous fabric. In other embodiments, the substrate 11 may be made of any materials that can be laterally stretched/compressed and can be bonded with the foam material. A magnetic material layer 15 is coated on a floor surface of a recess portion 12 of the substrate 11 in order to attach the fastening strap assembly 10 in a mold for molding a seat cushion during a seat cushion molding process.

The fastening strap assembly 10 according to this embodiment further includes a substantially fishbone-shaped fastening member 20 which is disposed on the substrate 11 between the sidewalls 13. The fastening member 20 includes an elongate central rib 21 and a plurality of fastening parts 22 laterally extending from either sides of the rib 21 along a length of the rib 21 with adjacent fastening parts 22 being spaced apart a distance from each other. Each fastening part 22 has a plurality of hooks 23 formed on an upper surface thereof. A lower surface of each fastening part 22 along with a lower surface of the rib 21 are bonded to the recess 12 of the substrate 11 so as to bond the fastening member 20 to the substrate 11. As shown in FIG. 4, the central rib 21 has a width W1 and a height D3 measured from the lower surface of the substrate 11 to a top surface of the rib 21, wherein the height D3 of the rib 21 has to be greater than the width W1, i.e. D3>W1, so as to provide an appropriate sideway bending/curving ability to the fastener member. This dimensional feature of the rib 21 and the space between adjacent fastening parts 22 together give the fastening strap assembly 10 of the present invention a sideway bending/curving capability. In addition, the height D3 of the central rib 21 is smaller than or equal to a height D1 of the hooks 23 measured from the lower surface of the substrate 11 to a top of the hooks 23, and a height D2 of the sidewall 13 measured from the lower surface of the substrate 11 is greater than the height D1 of the hooks 23 in order to provide a protection to the hooks 23 to prevent the foam material for the seat cushion from entering the spaces between the hooks 23 during the foam molding process of the seat cushion.

In the embodiment illustrated in FIG. 3, a number of through holes 16 are formed in the side wings 14 of the substrate 11 at positions corresponding to the fastening parts 22 of the fastening member 20 to allow the foam material to enter these through holes 16 so as to create an anchoring effect and provide an extra mechanical bonding force between the fastening strap assembly 10 and the seat cushion in order to more firmly bond the fastening strap assembly 10 to the seat cushion. In addition, although not shown in FIG. 3, the side wings 14 of the substrate 11 may have cut-outs formed at positions corresponding to the spaces between the fastening parts 22 to provide additional sideway bending/curving ability to the fastening strap assembly 10.

Figure 5:
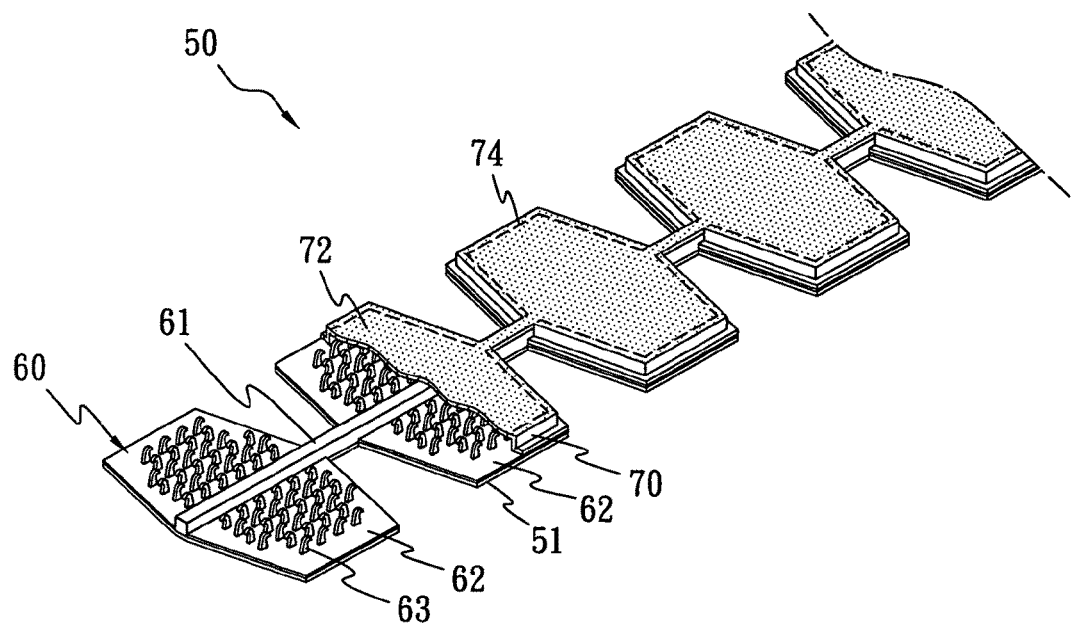
FIG. 5 is a schematic perspective view showing a fastening strap assembly according to another embodiment of the present invention.
Figure 6:
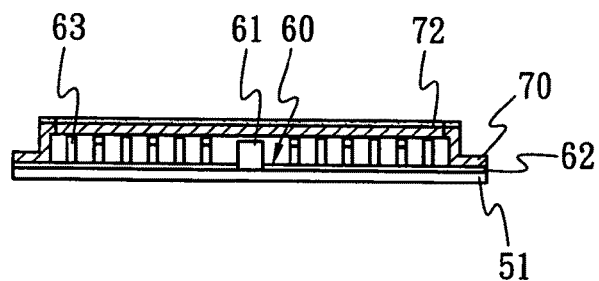
FIG. 6 is a schematic partial cross-sectional end view of the fastening strap assembly shown in FIG. 5.

Next, a fastening strap assembly 50 according to another embodiment of the present invention will be described with reference to FIGS. 5 and 6, wherein FIG. 5 is a schematic perspective view of the fastening strap assembly 50 and FIG. 6 is a partial cross-sectional end view of the fastening strap assembly 50.

As shown in the figures, the fastening strap assembly 50 mainly includes a fishbone-shaped fastening member 60, a substrate 51 disposed under the fastening member 60, and a protective layer 70 disposed above the fastening member 60. In this embodiment, the substrate 51 preferably has a fishbone shape which is substantially the same as that of the fastening member 60. In addition, similar to the substrate 11 of the embodiment described with FIG. 3, the substrate 51 is made of, for example, a foam material, a non-woven fabric or a fibrous fabric. However, other materials that can be laterally stretched/compressed and can be bonded with the foam material may be used as well.

In this embodiment, the fastening member 60 is substantially the same as the fastening member 21 of the embodiment shown in FIG. 3, that is, the fastening member 60 includes an elongate central rib 61 and a plurality of fastening parts 62 laterally extending from either sides of the rib 61 along a length of the rib 61 with adjacent fastening parts 62 being spaced apart a distance from each other. Each fastening part 62 has a plurality of hooks 63 formed on an upper surface thereof. A lower surface of each fastening part 62 along with a lower surface of the rib 61 are bonded to the substrate 51 so as to bond the fastening member 60 to the substrate 11.

As shown in FIG. 5, the protective layer 70 has a fishbone shape which is substantially the same as that of the fastening member 60 so as to substantially cover the fastening member 60. The protective layer 70 preferably is made of materials the same as those of the substrate 51, such as a foam material, a non-woven fabric or a fibrous fabric. However, other materials that can be laterally stretched/compressed and can be bonded with the foam material may be used as well. Alternatively, the protective layer 70 may be made of a material different from that of the substrate 51. For instance, the protective layer 70 may be made of a non-woven fabric and the substrate 51 may be made of a foam material.

As shown in FIG. 6, the substrate 51, the fastening member 60 and the protective layer 70 are bonded together along a periphery of the fastening parts 62 of the fastening member 61 by means of, for example, adhesive bonding or thermal fusing bonding, to seal the hooks 63 between the substrate 51 and the protective layer 70 to thereby preventing the foam material for the seat cushion from entering the spaces between the hooks 63 during the foam molding process of the seat cushion. A magnetic material layer 72 is coated on an outer surface of the protective layer 70 in order to attach the fastening strap assembly 50 is a mold for molding a seat cushion during a seat cushion molding process. Additionally, perforations 74 that penetrate the protective layer 70 and the magnetic layer 72 are provided along the bonded periphery of the protective layer 70 (see FIG. 5), to allow the protective layer 70 to be peeled off after the seat cushion molding process and to reveal the hooks 63 of the fastening member 60.

Figure 7:
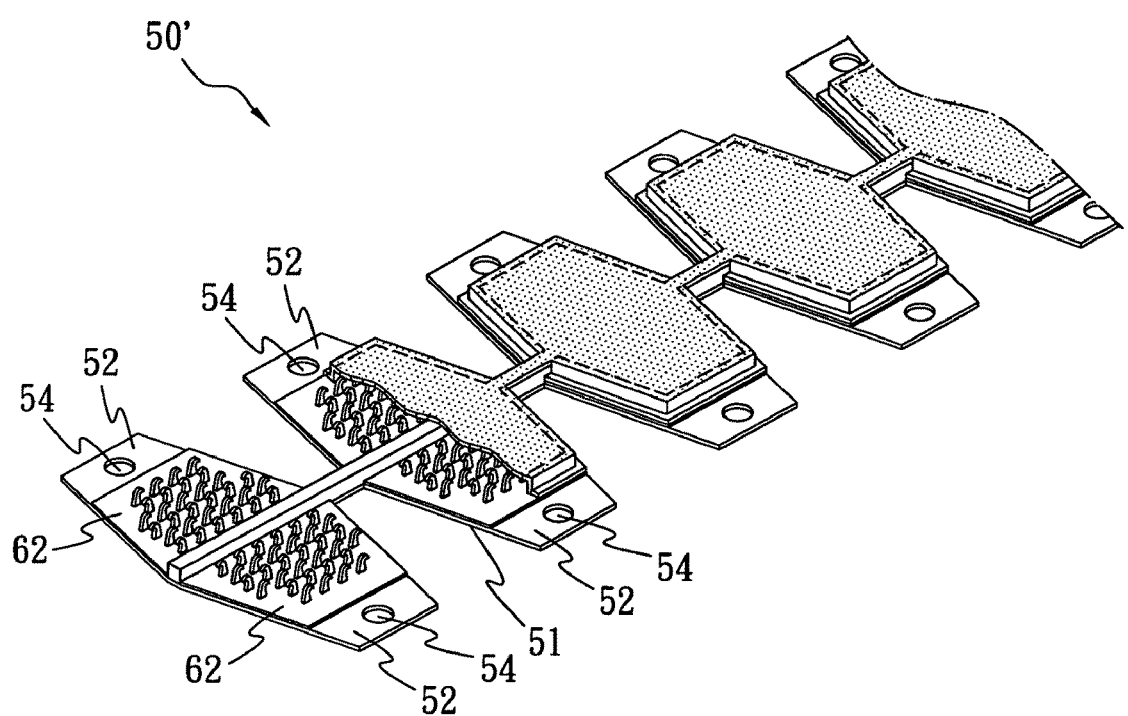
FIG. 7 is a schematic perspective view showing a modified fastening strap assembly of FIG. 5.

FIG. 7 is a schematic perspective view showing another fastening strap assembly 50' which is a modified embodiment of the fastening strap assembly 50 shown in FIG. 5. In this modified embodiment, in addition to having a similar structure as that of the fastening strap assembly 50 described with and illustrated in FIGS. 5 and 6, the substrate 51 of the fastening strap assembly 50' further includes side wings 52 formed at positions corresponding to the fastening parts 62 of the fastening member 60 and each side wing 52 has a through hole 54 formed therein to allow the foam material to enter these through holes 16 so as to create an anchoring effect and provide an extra mechanical bonding force between the fastening strap assembly 10 and the seat cushion.

Figure 8:
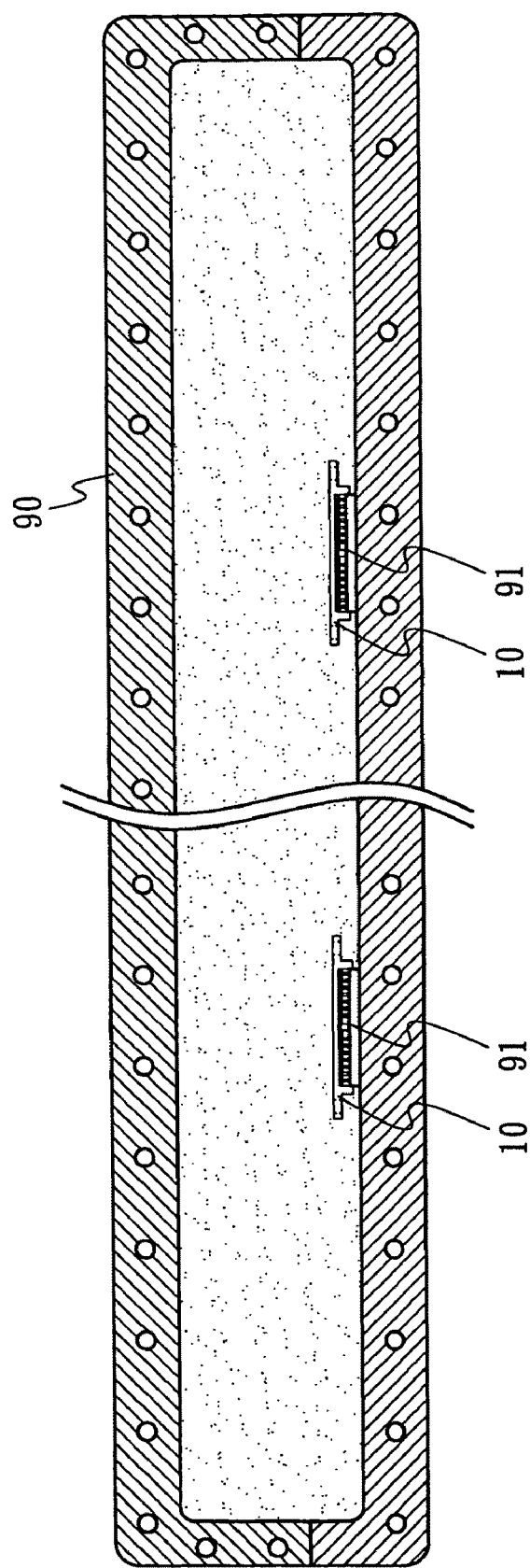
FIG. 8 is a schematic partial cross-sectional view of a mold for forming a seat cushion.
Figure 9:
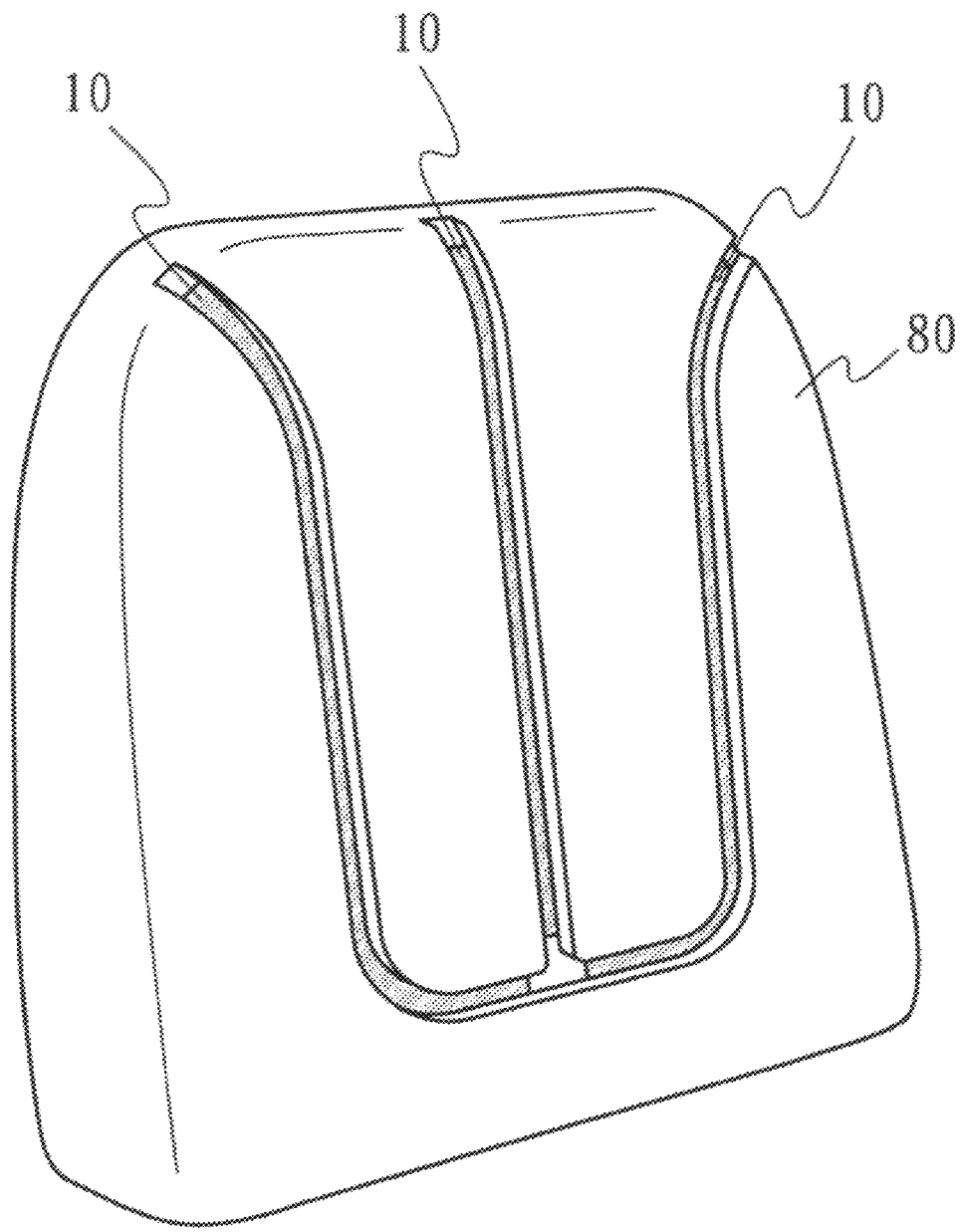
FIG. 9 is a schematic perspective view showing a seat cushion including the fastening strap assemblies of the present invention.

Next, by referring to FIGS. 8 and 9, a seat cushion 80 including the above-described fastening strap assembly according to another aspect of the present invention will be described. As shown in FIG. 8, a mold 90 for foam molding a seat cushion has magnets 91 disposed at positions planned to place the fastening straps and the fastening strap assemblies 10 are placed at the positions where the magnets 91 are disposed with the hooks 23 of the fastening strap assemblies 10 facing the mold 90, and thus the fastening strap assemblies 10 can be held in positions during the seat cushion molding process by the magnetic attraction force between the magnetic layer 15 of the fastening strap assemblies 10 and the magnets 91. After the foam molding process is completed, a seat cushion 80 including the fastening strap assemblies 10 of the present invention may be formed, as shown in FIG. 9. Although in this embodiment a seat foam cushion 80 is used as an example to illustrate that the fastening strap assembly of the present invention may be applied in a seat foam cushion, in fact, the fastening strap assembly of the present application may be applied in any foam articles that are produced by foam molding process.

Figure 10:
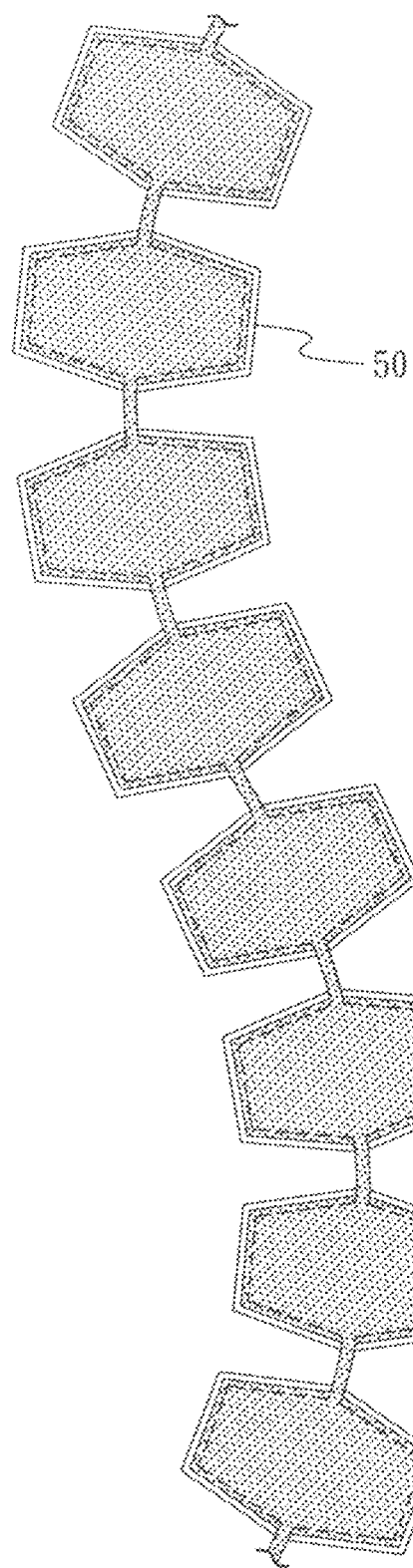
FIG. 10 is a schematic top view showing the sideway bending/curving capability of the fastening strap assembly of the present invention.

Because the fastening strap assembly of the present invention comprises the unique structural features such as the fishbone-shaped fastening member, the laterally stretchable/compressible substrate, etc., the fastening strap assembly of the present invention possesses a function/advantage that existing prior art fastening straps do not have, that is, the fastening strap assembly of the present invention can be arbitrarily bent/curved sideway, as shown in FIG. 10. This feature of bending/curving sideway is a feature that the existing prior art fastening straps do not posses and the sideway bending/curving function is a function that the existing prior art fastening straps are unable to perform. Because the fastening strap assembly of the present invention has this unique sideway bending/curving characteristic, the fastening strap assembly of the present invention is not only applicable to foam articles having straight bonding grooves, but also applicable to foam articles having curved bonding grooves with different curvatures and different curving orientations directly and without any additional processing, such as cutting, to the fastening strap assembly, as shown in FIG. 9. Therefore, the fastening strap assembly of the present invention is a creation that has a great industrial applicability.

Although the present invention has been described above according to the preferred embodiments thereof, this does not mean that the scope of the present invention is limited to specific structures and operation steps described above. In fact, there exist various modifications and variations under the principle and spirit disclosed above. For instance, in the above described embodiments, the fastening parts of the fastening member extend out laterally from either sides of the central rib in a symmetric manner, however, in other embodiments, the fastening parts of the fastening member may extend out laterally from either sides of the central rib in an asymmetric way, for example, in an interlaced way. Additionally, in the above-described embodiments, the fastening parts of the fastening member are illustrated in a form with rectangular and trapezoid shape, however, the fastening parts may have other shapes, for example, the fastening parts may have a semi-circular shape.

It will be apparent to people skilled in this art that many modifications can be made to the disclosed structures/steps without departing from the scope of the invention. Therefore, it is the intent of the appended claims to cover all such variations and modifications as come within the sprit and scope of this invention.

What is claimed is:

1. A fastening strap assembly for foam article comprising:
a substantially fishbone-shaped fastening member having an elongate central rib and a plurality of fastening parts laterally extending from either sides of the rib and longitudinally spaced apart from each other, each fastening part having a plurality of hooks formed on a upper surface thereof;
a laterally stretchable/compressible substrate having a fishbone shape substantially the same as that of the fastening member and being disposed under the fastening member and bonded thereto; and
a protective layer having a fishbone shape substantially the same as that of the fastening member and disposed above the fastening member to cover the fastening member, and a magnetic material layer coated on an outer surface thereof,
wherein the substrate, the fastening member and the protective layer are bonded together along a periphery of the fastening parts of the fastening member and perforations are provided in the protective layer and magnetic material layer along the bonded periphery thereof.

2. A fastening strap assembly for foam article according to claim 1, wherein the central rib has a width W1 and a height D3 measured from a lower surface of the substrate, and D3 is greater than W1 (D3>W1).

3. A fastening strap assembly for foam article according to claim 1, wherein the substrate is formed from a material that can be bonded with the foam material.

4. A fastening strap assembly for foam article according to claim 3, wherein the material that can be bonded with the foam material comprises a foam material, a non-woven fabric and a fibrous fabric.

5. A fastening strap assembly for foam article according to claim 1, wherein the protective layer and the substrate are made of the same material.

6. A fastening strap assembly for foam article according to claim 1, wherein the substrate further comprise side wings formed at positions corresponding to the fastening parts of the fastening member and each side wing has a through hole formed therein.

7. A foam article comprising:
a foam body; and
at least one fastening strap assemblies according to any one of claims 1-6 bonded to the foam body.

* * * * *